(12) United States Patent
Singh

(10) Patent No.: US 11,650,798 B2
(45) Date of Patent: May 16, 2023

(54) DEVELOPING SOURCE CODE LEVERAGING SMART GLASSES

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 246 days.

(21) Appl. No.: 17/333,216

(22) Filed: May 28, 2021

(65) Prior Publication Data
US 2022/0382523 A1  Dec. 1, 2022

(51) Int. Cl.
| | |
|---|---|
| G06F 8/34 | (2018.01) |
| G06F 8/33 | (2018.01) |
| G06F 21/57 | (2013.01) |
| G06N 20/00 | (2019.01) |
| G06N 5/04 | (2023.01) |
| G06T 19/00 | (2011.01) |
| G02C 9/00 | (2006.01) |
| G10L 15/26 | (2006.01) |
| G06F 1/26 | (2006.01) |
| H04W 76/30 | (2018.01) |
| G10L 15/22 | (2006.01) |

(52) U.S. Cl.
CPC .................. G06F 8/33 (2013.01); G02C 9/00 (2013.01); G06F 21/577 (2013.01); G06N 5/04 (2013.01); G06N 20/00 (2019.01); G06T 19/006 (2013.01); G06F 1/26 (2013.01); G06F 2221/033 (2013.01); G10L 15/22 (2013.01); G10L 15/26 (2013.01); H04W 76/30 (2018.02)

(58) Field of Classification Search
CPC ........................................................ G06F 8/36
See application file for complete search history.

(56) References Cited

U.S. PATENT DOCUMENTS

| | | | |
|---|---|---|---|
| 9,331,856 B1 | 5/2016 | Song | |
| 9,460,351 B2 | 10/2016 | Kim et al. | |

(Continued)

OTHER PUBLICATIONS

"DevOps," https://en.wikipedia.org/wiki/DevOps, Wikimedia Foundation, Inc., Mar. 9, 2021.

(Continued)

*Primary Examiner* — Jae U Jeon
(74) *Attorney, Agent, or Firm* — Weiss & Arons LLP

(57) ABSTRACT

Methods for supporting a development of application source code using input from a first smart glasses of a first user and a second smart glasses of a second user is provided. Methods may include retrieving the application source code from an internal development platform and displaying the application source code on an augmented reality ("AR") display of the first smart glasses and an AR display of the second smart glasses. Methods may include receiving, from the first smart glasses, a command to edit the application source code and in response, deactivating each input device of the second smart glasses. Methods may include receiving input of one or more edits on the first smart glasses and updating the application source code to include the input. Methods may include displaying the updated application source code on the AR displays and reactivating each input device of the second smart glasses.

20 Claims, 6 Drawing Sheets

(56) References Cited

U.S. PATENT DOCUMENTS

| | | | |
|---|---|---|---|
| 9,665,818 | B1 | 5/2017 | Cardinal et al. |
| 9,679,152 | B1* | 6/2017 | Young ................... G06F 21/31 |
| 9,823,735 | B2 | 11/2017 | Spiessl et al. |
| 2015/0310751 | A1* | 10/2015 | Tolia ........................ G09B 5/06 |
| | | | 434/309 |
| 2016/0041613 | A1 | 2/2016 | Klanner et al. |
| 2017/0156589 | A1 | 6/2017 | Wu et al. |
| 2017/0214696 | A1* | 7/2017 | Cleaver ................ H04L 63/104 |
| 2018/0005440 | A1* | 1/2018 | Mullins .................. G06F 9/452 |
| 2018/0036974 | A1 | 2/2018 | Hahn et al. |
| 2018/0108079 | A1* | 4/2018 | Traub ..................... G06V 20/20 |

OTHER PUBLICATIONS

"Smartglasses," https://en.wikipedia.org/wiki/Smartglasses, Wikimedia Foundation, Inc., Feb. 21, 2021.
"Wearable Technology-Smart Glasses," https://www.optiscangroup.com/smartglasses, Optiscan, Retrieved on Mar. 4, 2021.
"What is DevOps?" https://aws.amazon.com/devops/what-is-devops/, Amazon Web Services, Inc., Retrieved on Mar. 9, 2021.
"What Do You Know About Augmented Reality (AR) Technology?" https://immersivetechnologies.com/category/augmented-reality, Cequix Technology Solutions, Dec. 17, 2018.
"Sensors Off: Android Open Source Project," https://source.android.com/devices/sensors/sensors-off, Oracle, Apr. 27, 2021.

* cited by examiner

DEVELOPING SOURCE CODE LEVERAGING SMART GLASSES

FIELD OF TECHNOLOGY

Aspects of the disclosure relate to smart glasses. Specifically, this disclosure relates to leveraging smart glasses for building applications.

BACKGROUND OF THE DISCLOSURE

Application source code for applications is typically built in a collaborative environment. Programmers that build the code generally work in a team of at least two or more individuals. Each individual programmer builds on each other's work. Additionally, each individual programmer can update and/or change application code inputted by other members of the team.

Once the application source code is completed and deployed, the programmers may further collaborate to fix errors and bugs that may occur while the application is active.

The application source code may be stored on a central server accessible by each individual programmer. The changes and revisions to the application source code may be uploaded to the central server.

The team of programmers changing and revising the application source code may work in the same location. The team of programmers may work in different locations. The changes may be automatically uploaded to the server with respect to the other programmers. This enables each programmer to retrieve the most updated version of the application source code.

It would be desirable to implement smart glasses for building, revising and updating application source code. It would be further desirable to implement smart glasses for each of the programmers to enable collaboratively building, revising and updating the application source code.

For the purposes of this disclosure, smart glasses may be understood to mean wearable glasses that include one or more processors as well as other related components.

Additionally, when an application is deployed and an error or bug occurs in the application, it would be further desirable to leverage the smart glasses of each individual programmer to resolve the errors and bugs occurring in the application.

SUMMARY OF THE DISCLOSURE

A method for supporting the development of application source code using input from a first smart glasses of a first user and a second smart glasses of a second user is provided. The first smart glasses and the second smart glasses may be in electronic communication with an internal development platform.

The method may include retrieving the application source code from the internal development platform.

The method may include displaying the application source code on an augmented reality ("AR") display of the first smart glasses or other suitable displays. The method may include displaying the application source code on an AR display of the second smart glasses. The AR display of both the first smart glasses and second smart glasses may be in a read-write state. The read-write state may be a default state for the AR display of both the first and second smart glasses.

The method may further include receiving, from the first smart glasses, a command to edit the application source code.

The command may be inputted by selecting a selected option from selectable options displayed on the display. The selecting may be performed via an air-based hand gesture. The selecting may be via a touch pad embedded on the frame of the smart glasses. The selecting may be performed using any suitable movement.

In response to the receiving of the command, the method may include maintaining the read-write state on the first smart glasses. In some embodiments, in response to the receiving of the command, the method may further involve toggling the read-write state on the second smart glasses from the read-write state to a view-only state. The toggling may include deactivating each input device of the second smart glasses from receiving input.

The method may include receiving the input of one or more edits from one or more input devices on the first smart glasses.

Input devices on both the first smart glasses and second smart glasses in accordance with principles of the disclosure may include, but may not be limited to, a camera, a microphone, an AR keypad, a wireless keypad and a touchpad embedded on a frame of the smart glasses.

In response to receiving the input of one or more edits, the method may include updating the application source code to include the one or more edits.

The method may include displaying the updated application source code on the display on both the first smart glasses and the second smart glasses.

Following the displaying, the method may include toggling the view-only state of the second smart glasses to the read-write state. The toggling may include reactivating each input device of the second smart glasses to enable receiving input.

In some embodiments, following the toggling the method may include overwriting, at the internal development platform, the application source code with the updated application source code.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
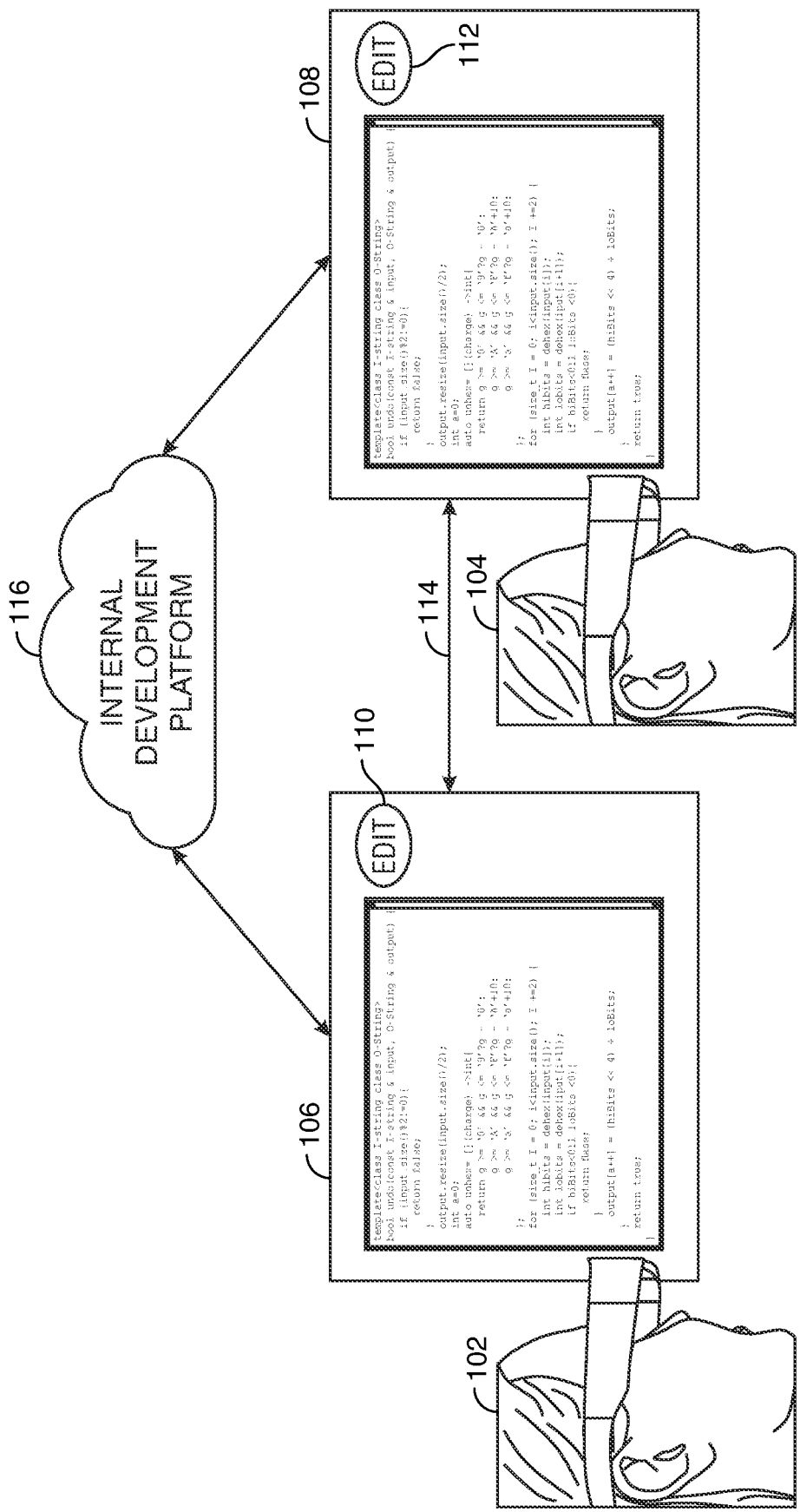
FIG. 1 shows an illustrative architecture diagram in accordance with principles of the disclosure.

Architecture, systems and methods for leveraging smart glasses to support the development of application source code is provided. Architecture, systems and methods may leverage one pair of smart glasses, two pairs of smart glasses, and in some embodiments, a plurality of smart glasses to support the development of the application source code.

A smart glasses architecture may include both hardware components and software components.

Smart glasses may be understood to mean wearable glasses that include both hardware and software components. One or more processors may be included in the hardware components of the smart glasses. The one or more processors may include one or more microprocessors. The microprocessor may provide processing capabilities to the plurality of hardware components and the plurality of software components within the smart glasses. The microprocessor may be operable to retrieve application source code from an internal development platform and process the user input received at the smart glasses.

In addition to the processors, smart glasses may also include hardware components associated with conventional glasses. Such conventional components may include a frame and lenses. The frame may clasp the lenses.

Other hardware components of smart glasses may include one or more displays, one or more sensors, one or more cameras for capturing photographs and/or videos, one or more audio input devices, one or more audio output devices, one or more communication transceivers, one or more wired and/or wireless communication applications (e.g., Bluetooth®, Beacon®) and/or any other suitable hardware components.

The input devices and sensors may be enabled to capture input. For example, the user input may be received from the user via touch gestures to one or more dynamic and/or static buttons on the smart glasses. The input received may be via an air-based hand gesture.

The user input may also be received at, and/or sensed by, a nano touch screen included in the smart glasses. The nano touch screen may be a nano light emitting diode ("LED") touch screen. The nano touch screen may be a nano organic light emitting diode ("OLED") touch screen. The nano OLED touch screen may be constructed using OLED technology.

OLED technology may enhance functionality of a smart glasses display. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display, power must be supplied to the entire backlight, even to illuminate one pixel in the display. In contrast, an OLED display does not necessarily include a backlight. Furthermore, in an OLED display, preferably, only the illuminated pixel draws power.

The power efficiency of OLED technology presents a possibility for designing nodes that consume less power for their basic functionality and allow any residual power to provide enhanced security and functionality. Illustrative devices that may be constructed using OLED technology are disclosed in commonly assigned U.S. Pat. No. 9,665,818, which is hereby incorporated by reference herein in its entirety.

In some embodiments, the nano touch screen may be constructed, using liquid metal printing, from atomically-thin indium-tin oxide ("ITO"). During construction, an indium-tin alloy is heated to 200 degrees Celsius. At 200 degrees Celsius, the indium-tin alloy becomes a liquid. The liquid is then rolled over a surface to print nano-thin sheets of ITO. These nano sheets are two-dimensional and have the same chemical make-up as standard ITO. However, these nano sheets have a different crystal structure than standard ITO. The new crystal structure gives the nano sheets new mechanical and optical properties.

One new property may include the full flexibility of the ITO sheets. These ITO sheets also absorb approximately 0.7% of light, which is lower than standard conductive glass that absorbs 5-10% of light. These ITO sheets may also be transparent. As such, these nano ITO sheets provide fully flexible, conductive and transparent material. Therefore, such atomically-thin ITO sheets may be used to produce nano touch screens for inclusion in smart glasses. The ITO may be wrapped around a portion of the lenses and/or frames of the smart glasses.

The nano LED touch screen may receive touch-based user input, also referred to herein as touch gestures. It should be appreciated that the touch gestures may be accepted at one or more portions of the frames and/or lenses of the smart glasses. As such, the nano LED touch screen may cover a portion of the frames and/or lenses of the smart glasses. Touch gestures may include swiping, tapping, squeezing and any other suitable touch gestures. Touch gestures may also include a pattern of any of the above-mentioned gestures.

The user input may also be received from air-based hand and/or body gestures. Air-based hand and/or body gestures may be performed by the user's hand and/or body without specifically touching the smart glasses.

Various sensors may be included in the smart glasses. These sensors may include the nano LED touch screen, the camera(s), an accelerometer, a gyroscope and any other suitable sensors. These sensors may sense the touch gestures, hand gestures and/or air gestures.

Upon sensing the touch gestures, hand gestures and/or air gestures, the sensor(s) and/or associated processors may translate the touch gestures, hand gestures and/or air gestures into user input. The user input may be based on a user input structure. The user input structure may be a digital alphanumerical pad. In some embodiments, the user input structure may be received from an external processor.

The smart glasses display may display data as instructed by the microprocessor. In one embodiment, the smart glasses display may be physically configured to add data alongside what the wearer sees through the lenses. In some embodiments, the smart glasses display may display data as an at least partially transparent overlay on top the lenses. As such, the user may view, through the overlay, the physical objects that are normally seen through lenses. Such a smart glasses display may be known as an augmented reality smart glasses display.

AR may be enabled by the steps of receiving input, processing the input and then outputting it onto a surface. In accordance with principles of the disclosure, the input captured by a camera and/or sensors of the smart glasses may be gathered and transmitted to the microprocessor for processing and interpreting.

Smart glasses may also include, but may not be limited to, a global positioning system (GPS), Wi-Fi, Bluetooth microchip, random access memory ("RAM"), flash memory, a graphical processing unit ("GPU"), a central processing unit ("CPU"), magnetometer, gyroscope and an accelerometer. These components may enable the smart glasses to analyze and process the input.

Following the processing of the input, the smart glasses, using AR, may project software displays onto a scene, surface, multiple scenes and smartphone screen.

Additionally, smart glasses may utilize cellular technology or Wi-Fi to be operable as wearable computers which may run self-contained mobile applications. Smart glasses may be hands-on and/or hands-free and may be enabled to communicate with the Internet through natural language voice commands. Some smart glasses may require the use of touch buttons on the frame.

The weight of such smart glasses devices may be in the area of between about 20 grams to 60 grams or less or more than this range. The width of the lenses of such smart glasses devices may be between about 45 millimeters (mm) and 65 mm, and most preferably between about 50 mm to 56 mm. The length of the frames may be between about 126 mm and 153 mm.

Another component of smart glasses may include the ability for smart glasses to modify its optical properties, such as tint and change the prescription of the lenses. The optical properties modification may be executed at any given time. Smart glasses may change optical properties of the lenses by executing one or more software applications on the internal processors.

Smart glasses may also include one or more communication transceivers. The communication transceivers may be operable to communicate with external processors. The external processors may be included in a mobile device or any other suitable computing device.

The smart glasses may include a nano wireless network interface card ("NIC"). The nano wireless NIC may be a circuit board and/or a chip, installed within the smart glasses, that enables the smart glasses to establish communication with a wireless network. The nano wireless NIC may support input/output ("I/O"), interrupt, direct memory access, interfaces, data transmission, network traffic engineering and/or partitioning.

The nano wireless NIC may provide the smart glasses with a dedicated, full-time connection to a wireless network. The nano wireless NIC may provide the connection by implementing the physical layer circuitry necessary for communicating with a data link layer standard, such as Wi-Fi.

The nano wireless NIC may operate as an intermediary between the smart glasses and a wireless network. For example, the processor may transmit a request to the nano wireless NIC. The nano wireless NIC may convert the request into electrical impulses. The electrical impulses may be transmitted to a web server. The web server may respond to the nano wireless NIC with additional electrical signals. The nano wireless NIC receives the additional electrical signals. The nano wireless NIC translates the additional electrical signals into data that is consumable by the microprocessor.

The smart glasses may include a battery. The battery may be configured to power the microprocessor, the input devices, the NIC, the display and any other suitable device.

The smart glasses may include a network controller module. The network controller module may be configured to interface between the nano wireless network interface card and an external Wi-Fi device to provide wireless connectivity to the smart glasses device.

The smart glasses may also include an active near field communication ("NFC") reader configured to establish a communication with one or more other smart glasses devices within a pre-determined proximity to the smart glasses device. Smart glasses may communicate with one or more additional smart glasses and other smart devices using NFC technology.

The smart glasses may include software components. One or more software modules may execute on the processors. The one or more software applications may be stored in a memory located within the smart glasses. The one or more software modules may, in the alternative, be referred to as applications. The applications may enable the smart glasses to execute various tasks.

The smart glasses device may include a contactless communication application. The contactless communication application may operate on the smart glasses processor. The contactless communication application may initiate communication with another smart glasses. In some embodiments, the contactless communication application may be an active near field communication ("NFC") reader. As such, the contactless communication application may communicate with another smart glasses using NFC technology.

In accordance with principles of the disclosure, smart glasses may be leveraged to support the development of application source code. The smart glasses may be a first smart glasses. The first smart glasses may pair with a second smart glasses to collaboratively develop, amend and resolve vulnerabilities and errors associated with the application source code. Vulnerabilities may include syntax errors within the code. Vulnerabilities may also include personal, private and/or secure data included in the code.

The application source code may be code associated with an in-progress application. The application source code may be associated with an application already deployed and live. The application source code may be stored and executed within an internal development platform of an entity.

The internal development platform may be an internal network of the entity where source code for applications may be created, developed and deployed. The internal development platform may include one or more networks and servers. The internal development platform may be setup as a software development and IT operations type ("DevOps") platform. A DevOps platform may be a platform that combines software development and IT operations within a software development environment.

The DevOps platform may enable an entity to increase the entity's ability to deliver applications and services at high velocity. The DevOps platform may enable automating and streamlining the software development and infrastructure management processes. DevOps tools enable performing very frequent but small updates. Frequent but small updates may enable each deployment less risky. Errors and bugs may be corrected faster because associated teams may identify the last deployment that caused the error. Updates, in a DevOps platform may be deployed frequently. Additionally, a microservices architecture may be used within the DevOps platform which may enable decoupling large, complex systems into simple independent projects. The applications may be divided into a plurality of individual components and may be operated independently.

The DevOps platform may also enable continuous integration which may enable changes in code to be regularly merged into the central repository within the platform after which automated builds and tests may be run. The continuous integration may enable identifying vulnerabilities and bugs and reduce the time it may take to be validated and deployed. The DevOps platform may also enable continuous delivery within the platform which may enable deploying all code changes to a testing environment and/or a production environment after the build stage.

An AR display may be operable to display the application source code using augmented reality as instructed by the microprocessor to a smart glasses user.

In some embodiments, the microprocessor may retrieve the application source code from the internal development platform. The AR display may then display the retrieved application source code. In other embodiments, a camera may capture the application source code displayed on a user interface ("UP") and the AR display may then display the captured application source code on the AR display.

The AR display may be configured to operate in a plurality of states. One state may include a read-write state. The read-write state may be the default state of the smart glasses. The read-write state may enable all input devices to be in an enabled mode and be configured to capture input. Another state may include a view-only state. The view-only state may automatically turn off and disable and/or deactivate all input devices of the smart glasses.

It should be appreciated that in some embodiments, when the input devices are disabled the input devices may still be enabled to capture data, however the captured data may not be transmitted for processing until re-enabled. In other embodiments, the deactivating may include turning off the sensors from capturing data.

The smart glasses may include an active near field communication ("NFC") reader. The active NFC reader may be operable to detect a second smart glasses. The second smart glasses may be within a predetermined proximity to the smart glasses. The NFC reader may enable the smart glasses to establish communication with the second smart glasses.

The smart glasses may include an NFC controller module. The NFC controller module may be operable to activate NFC communication via the NFC reader with the second smart glasses. Following the activation, the smart glasses may transmit to the second smart glasses, the application source code.

This active communication may enable the smart glasses and the second smart glasses to be paired and share data.

In some embodiments, the smart glasses may authenticate the second smart glasses before sharing the application source code. An authorization application, included in the smart glasses, may authenticate the user of the second smart glasses. The authentication may be performed via an authorization application included in the smart glasses device. The authorization application may authenticate the user based on a group of detected user behavioral characteristics. The group of detected user behavioral characteristics may include gait, speed, voice detection, head movements and body movements. The authorization application may authenticate the user using any suitable authentication method.

The authorization application may include intelligent iris recognition mechanisms that may authenticate the user based on the detected iris.

An AR display of the second smart glasses may be operable to display the application source code received from the smart glasses. The displaying may be enabled using augmented reality. The displaying may be displayed as instructed by the microprocessor to a second smart glasses user.

The microprocessor of the smart glasses may be configured to receive via the one or more input devices of the smart glasses, a command from the user to edit the application source code. The command may be input. The input may be a touch gesture on a selected option selected from selectable options displayed on the display of the smart glasses. The selectable options may be displayed alongside the application source code. The selectable options may be displayed as an overlay on top of the application source code.

The user of the smart glasses may preferably touch a selected option and one or more input devices may be enabled to capture the command.

In some embodiments, a command may be received via touch on the keypad embedded on the frame of the smart glasses. Additionally, the command may be received via an air-swipe captured by one of the input devices.

In response to the receipt of the command, the microprocessor may transmit an instruction to the second smart glasses to deactivate one or more input devices on the second smart glasses from receiving input.

The microprocessor of the second smart glasses may be operable to toggle a state of the AR display to the view-only state by disabling the one or more input devices and any other sensors.

It should be appreciated that when input devices and/or any other sensor on the smart glasses is deactivated, the input devices and sensors may halt from transmitting any data to the system, microprocessor or any other system application. When the input devices and sensors are enabled, the data may then be transmitted to the system, microprocessor and other system applications. Input may be received and temporarily stored at the input devices and/or any other sensor and when the second smart glasses is toggled from the view-only state to the read-write state, the microprocessor may be configured to retrieve the stored inputs and process the stored inputs.

The user of the smart glasses may edit the application source code. The edits may be inputted by touch gestures on an AR keypad. The AR keypad may be projected on the AR display. The AR keypad may be projected apart from the application source code. The microprocessor of the smart glasses may be configured to receive input of one or more edits via one or more input devices on the smart glasses.

The edits may include input of one or more of an alpha character, a numeric character, an alphanumeric character, an alphanumeric character string and a cross out. The characters may include one word to be added or removed from the code. The characters may include a few words to be added or removed from the code. The characters may include a function, class, object and/or any other larger snippet of code.

In some embodiments, the edits may include a voice command of the user. The voice command may be captured by a microphone or any other audio input device. The smart glasses may be configured to record the voice command via the audio input device of the first smart glasses. Following the recording, the microprocessor may be configured to transcribe the voice command into text. The text may then be implemented into the application source code displayed on both the first and second smart glasses.

In some embodiments, the smart glasses may include an editing controller application. The editing controller application may be configured to display to an AR keypad. In addition to the AR keypad, the editing controller application may be configured to display a selection of selectable edit-options. The selection may include highlighting, inserting a comment, cross-outs, underline and any other relevant editing tools. The sensors may identify the input of a selected edit-option and the microprocessor may be configured to receive the input of the selected option. The microprocessor may be further configured to process the input and display the editions within the application source code.

The microprocessor may process the edits and update the application source code to include the one or more edits. The updated application source code may be shared with the second smart glasses. The updated application source code may be displayed on the AR display of the second smart glasses.

Following the display of the updated application source code the state of the AR display of the second smart glasses may be toggled back to the read-write state and some, or all of the input devices of the second smart glasses may be enabled. The enabling may enable the user of the second smart glasses to edit the application source code.

It should be appreciated that in some embodiments, the smart glasses may be toggled back to the default state automatically after the application source code is updated. In other embodiments, the toggling may be performed after a pre-determined duration of time. The pre-determined duration of time may be a few seconds, a few minutes or any other suitable duration of time a user may need to input changes to the application source code.

In other embodiments, when the user completes the editing, the user may de-select the edit button displayed. In response to a receipt of the command to de-select the edit button, the second smart glasses may toggle back to the read-write state.

In some embodiments, the disabling of the sensors and other input devices may include terminating a wireless communication on the second smart glasses for a pre-determined duration of time.

In some embodiments, prior to updating the application source code to include the edits, the microprocessor may be configured to execute a vulnerability detection application on the application source code. The vulnerability detection application may be configured to identify one or more vulnerabilities within the application source code using machine-learning ("ML"). The identifying may include searching the application source code for one or more features within the application source code corresponding to one or more features stored in a ML database. Each feature may be associated with at least one of the vulnerabilities.

When one or more vulnerabilities is detected, the smart glasses may be configured to pair with a plurality of smart glasses to resolve the vulnerability by sharing the application source code with the plurality of smart glasses. Sharing the application source code with a plurality of smart glasses may enable a plurality of users of the smart glasses to collaboratively view, review and edit the application source code.

Following the sharing, the application source code may be displayed on an AR display of each of the plurality of smart glasses.

Each of the plurality of smart glasses may be in the default state. Upon receipt of input from any one of the plurality of smart glasses, each of the remaining plurality of smart glasses may be toggled to the view-only state thereby disabling the input devices of the smart glasses and the remainder of the plurality of smart glasses.

In some embodiments, prior to sharing the application source code with the plurality of smart glasses, the smart glasses may be enabled to either opt-in or opt-out of receiving the application source code.

The smart glasses may transmit a communication to the plurality of smart glasses. For each smart glasses that may opt-in to accept the communication, the application source code may be transmitted and displayed on the AR display of the smart glasses that accepted the communication.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows an illustrative diagram of an application source code development architecture 100. Architecture 100 may include a first smart glasses 102 and a second smart glasses 104. Architecture 100 may also include an internal development platform 116. The first smart glasses 102 and the second smart glasses 104 may both be in direct communication with the internal development platform 116.

It should be appreciated that the first smart glasses 102 and the second smart glasses 104 may directly communicate with each other as well, as shown at 114. First smart glasses 102 and second smart glasses 104 may also be in direct communication with the internal development platform 116.

First Smart glasses 102 may include AR display 106. Second smart glasses 104 may include AR display 108. The AR display on both 106 and 108 may project an exemplary portion of in-progress application source code. The application source code may be associated with an application.

The application source code may be directly linked to the internal development platform 116. In some embodiments, any changes that are made to the application source code may be directly updated at the central server within the internal development platform. In other embodiments, any changes that are made to the application source code may be, upon receipt of instructions from the smart glasses, uploaded to the server and overwrite the original application source code stored.

In this exemplary diagram, two individuals are wearing smart glasses and viewing the in-progress application source code through an AR display on the smart glasses.

Both the AR display 106 and AR display 108 display a dynamic button of a selectable option to edit the application source code. The editing may be enabled via a touch gesture on the edit button 110 and 112.

First smart glasses 102 and second smart glasses 104 may be enabled to edit the application source code. First smart glasses 102 and second smart glasses 104 may be enabled to operate in a read-write state. The read-write state may be the default state.

Following input of a touch gesture on either the edit button 110 of the first smart glasses 102 or the edit button 112 of the second smart glasses 104, the edit button of the other smart glasses may be deactivated. By disabling the edit button, the other smart glasses may be operating in a view-only state and may be enabled to view the changes inputted from the other smart glasses but may not be enabled to edit the application source code. This automatically enables one smart glasses to edit the application source code without clashing with the other smart glasses.

Figure 2:
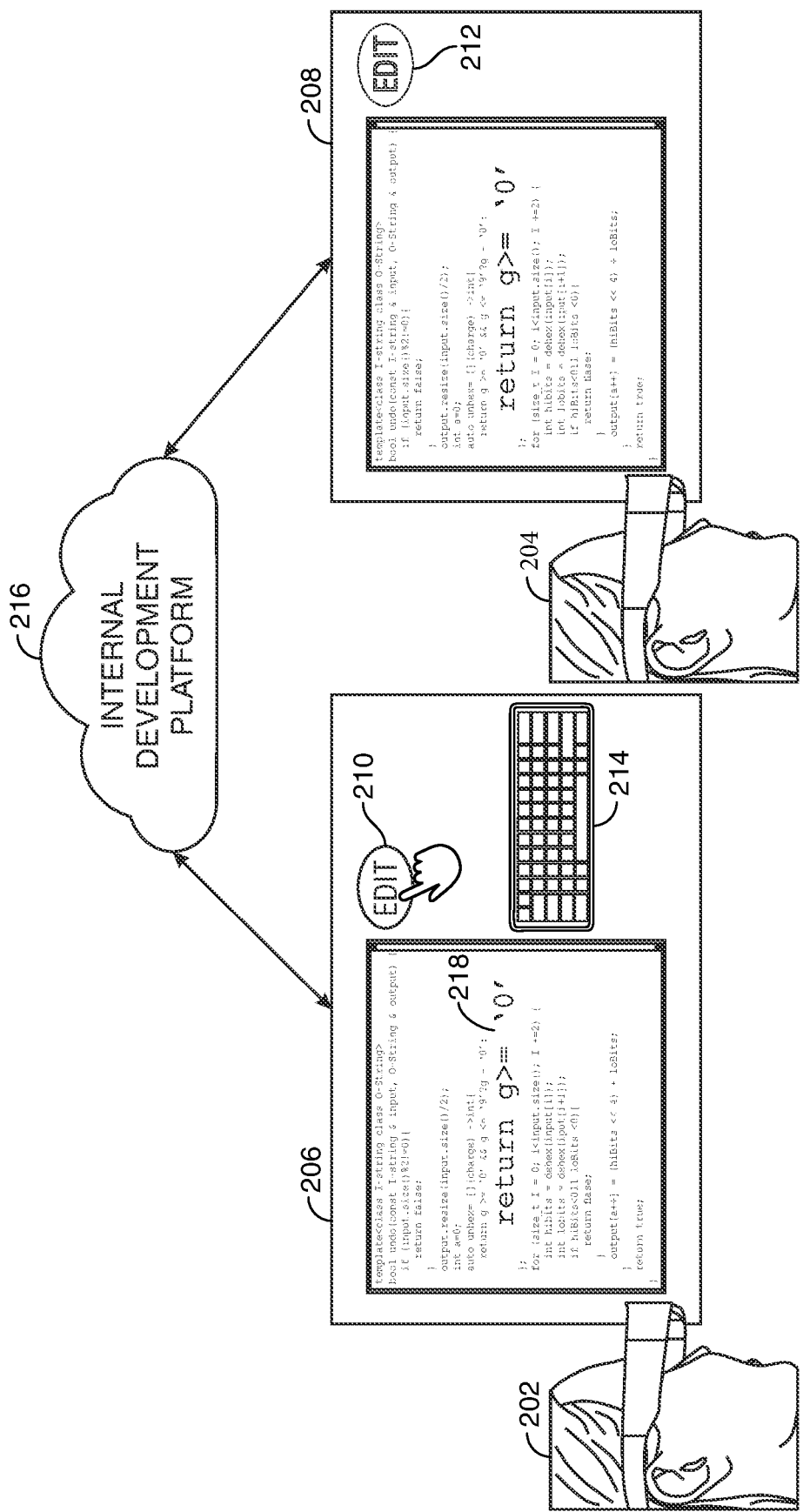
FIG. 2 shows an illustrative flow diagram in accordance with principles of the disclosure.

FIG. 2 shows another illustrative diagram of the application source code development architecture as described in FIG. 1. Illustrative diagram 200 shows the AR display 206 of smart glasses 202 and the AR display 208 of smart glasses 204 while being edited.

A touch gesture on edit button 210 may be performed and may enable the edit button 210 to be depressed. In response to the touch gesture on AR display 206, edit button 212 at AR display 208 may automatically be deactivated. Furthermore, in response to the touch gesture on edit button 210, an AR keypad 214 may be projected onto AR display 206 of smart glasses 202. The AR keypad 214 may be enabled to receive touch gestures on each of the displayed keys on the keypad and in response to the touch gestures, display the inputted characters within the area of the application source code selected.

In response to the touch gestures inputted at 214, the characters may be displayed on both the application source code of AR display 206 and 208.

The user of smart glasses 202 may be enabled to touch the location within the application source code where the inputted characters may be displayed. In response to the touch of the location, a cursor may be displayed at the location. The cursor may be dragged to a different position by a touch gesture. The cursor may be positioned using a touch pad on the frame of the smart glasses as well.

The AR display 206 of smart glasses 202 may be enabled to receive input following the selecting of the edit button for a threshold amount of time. When the threshold amount of time lapses, both AR displays 206 and 208 may be enabled to be in a read-write state and receive input. The edit button 210 and 212 may both be activated.

In some embodiments, the threshold amount of time may be a pre-determined amount of time following a pause of receiving any form of an input. For example, when the user of smart glasses 202 inputs a snippet of code, as shown at 218, and completes the input, the system is configured to allow for additional input for the pre-determined amount of time. The pre-determined amount of time may be a range between five and ten seconds. The pre-determined amount of time may be up to 15 seconds. Following the passing of the pre-determined amount of time where input has not been received at smart glasses 202, both AR displays 206 and 208 are reset to the read-write state and enabled to receive input.

It should be appreciated that although FIG. 2 shows the first smart glasses 202 in the read-write state at first and the second smart glasses 204 being set to the view-only state, in other embodiments, the second smart glasses 204 may initiate a command to edit and be configured to the read-write state at first and smart glasses 202 may be set to the view-only state.

Both smart glasses 202 and 204 may be linked to the internal development platform 216. In some embodiments, the linking may be enabled via a wireless communication to the internal development platform. Additionally, smart glasses 202 and 204 may be enabled to exchange data using NFC. Smart glasses 202 may include a first NFC component. The second smart glasses 204 may include a second NFC component. The first smart glasses and second smart glasses may communicate with each other via the first NFC component and the second NFC component.

Figure 3:
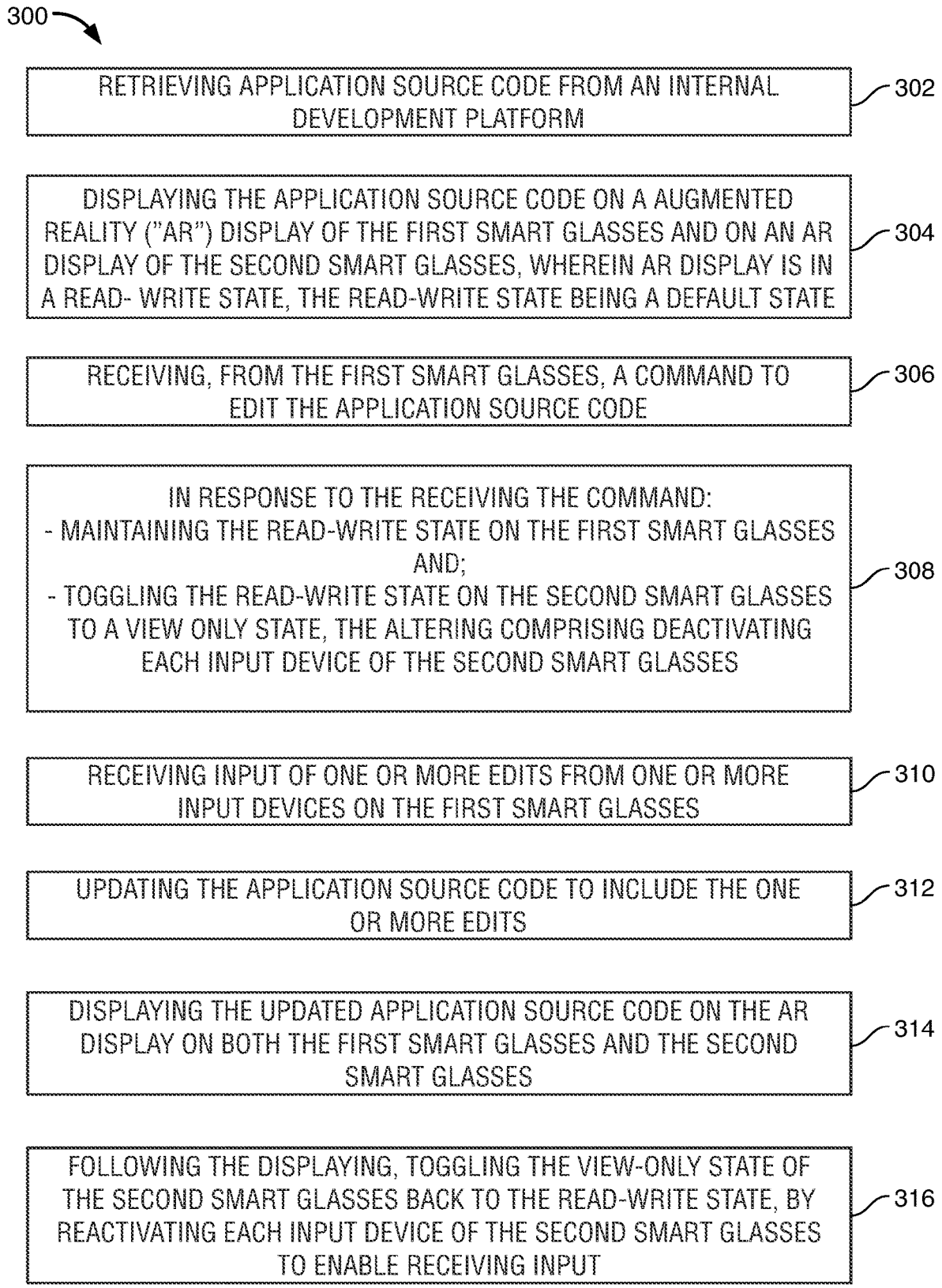
FIG. 3 shows an illustrative diagram in accordance with principles of the disclosure.

FIG. 3 shows an illustrative flow chart 300 of steps for leveraging smart glasses for building and editing application source code.

At 302, the first smart glasses may retrieve application source code from the internal development platform. At 304, the application source code may be displayed on the AR display of the first smart glasses and at the same time, on an AR display of the second smart glasses. The AR display of both the first and second smart glasses may be in the default state which is the read-write state.

At 306, a command may be received at the first smart glasses. The command may be a touch gesture received at the AR display to edit the application source code. In response to the receiving of the command, at step 308, the read-write state of the AR display at the first smart glasses may be maintained and the state of the second smart glasses may be toggled to the view-only state. The view-only state may include disabling each input device on the second smart glasses from receiving input.

At 310, following the disabling of each input device on the second smart glasses, input of one or more edits may be received from one or more input devices on the first smart glasses. The input may be received on the touch pad embedded on the frame. The input may be received via touch gesture on an AR keypad on the display of the first smart glasses.

At step 312, in response to receipt of the input of one or more edits, the application source code may be updated to include the one or more edits.

At step 314, the edits may be displayed on both AR displays of the first and second smart glasses.

At step 316, following the displaying, the view-only state of the second smart glasses may be toggled back to the read-write state and each input devices of the second smart glasses may be enabled to receive input.

Figure 4:
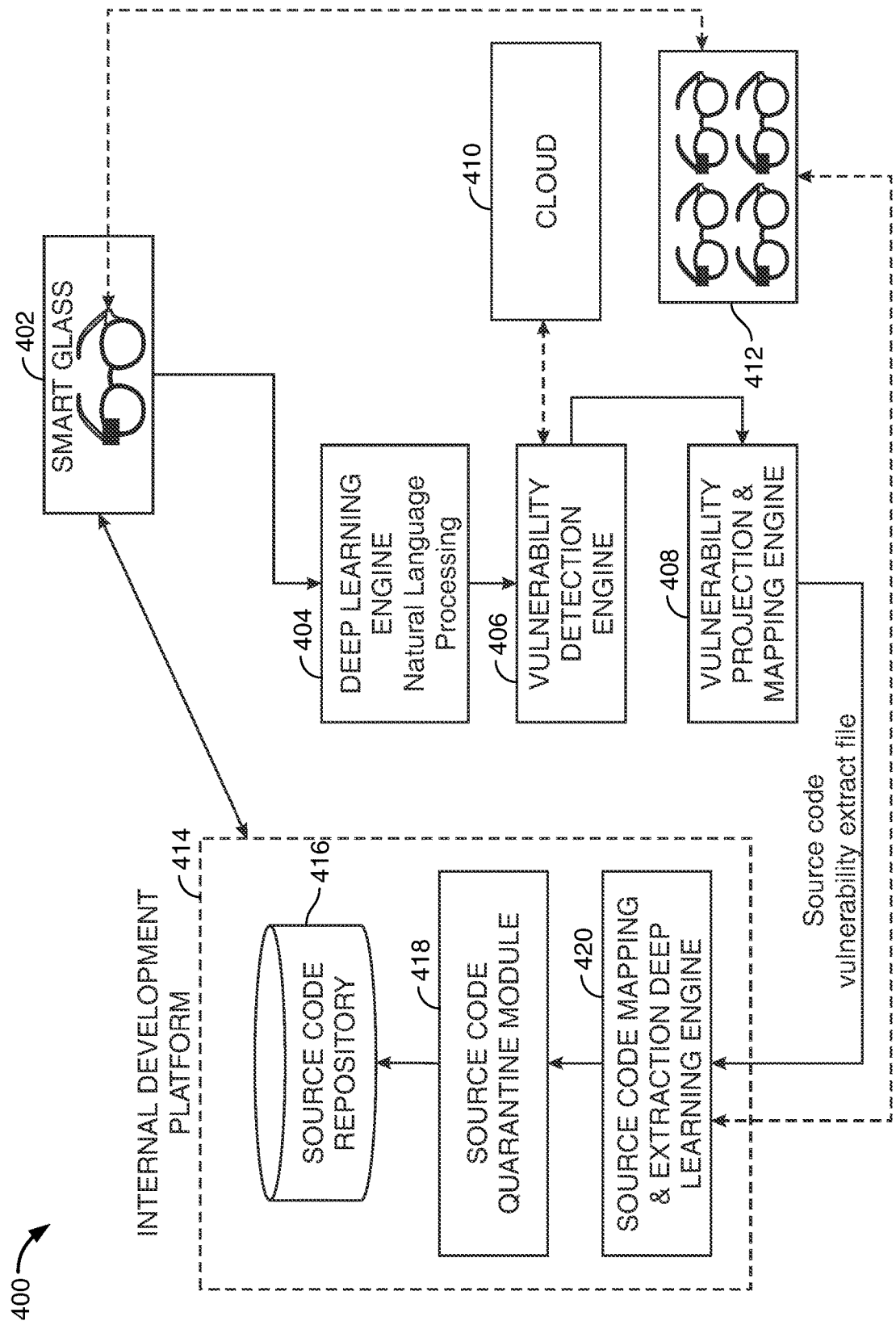
FIG. 4 shows an illustrative diagram in accordance with principles of the disclosure.

FIG. 4 shows an exemplary diagram 400. Diagram 400 may show smart glasses 402 paired with a plurality of smart glasses 412.

It should be appreciated that smart glasses 402 may be paired with one or more smart glasses 412 via a local network. The smart glasses may be paired via the internal development platform 414. This may enable a team of programmers to view the same application source code on each of their own smart glasses and share the mark-ups as well as any identified vulnerabilities.

Additionally, in some embodiments, the smart glasses may not need to be within close proximity to enable sharing the editions of the application source code.

The application source code may be a portion of code from an application being developed. The application source code may be already deployed code where an error or bug occurred and needs resolving.

Smart glasses 402 and 412 may include one or more microprocessors, one or more displays, one or more cameras, one or more audio input devices, one or more audio output devices and/or one or more wired and/or wireless communication modules (e.g., Bluetooth Beacon®).

In this exemplary diagram, smart glasses 402 and 412 may be paired to resolve one or more vulnerabilities within application source code. The smart glasses may be configured to automatically identify the vulnerabilities. The smart glasses may include one or more applications for identifying the vulnerabilities. The application source code may be maintained as is received from the internal development platform 414.

Application source code may be parsed into a deep learning engine as shown at 404 to identify vulnerabilities. The application source code may be projected on the smart glasses. The deep learning engine may be an application that may parse the code and run a vulnerability detection engine 406 to identify one or more vulnerabilities that may exist in the application source code. The vulnerability detection engine 406 may be an application executed by the processor that may analyze the code and based off of a library of previously stored vulnerabilities on the cloud at 410, identify the vulnerabilities within the application source code. The cloud may be separate from the internal development platform. The cloud may be included within the internal development platform. The cloud may include a database for storing the library of vulnerabilities.

The vulnerability projection and mapping engine 408 may be an additional application run on the smart glasses to identify vulnerabilities. This may be an automatic process.

The vulnerability detection engine 406 may also include a tool that may enable marking the code that may be vulnerable i.e.—highlight and lock. The smart glasses may include a Microsoft hololens that may use holographic processing. The smart glasses within the AR environment may enable the selecting and highlighting of the code.

Additionally, the user of the smart glasses may also be enabled to analyze the code to identify vulnerabilities. The smart glasses may be enabled to receive input of a selected text and highlighting text by hand movements that may be detected by one or more sensors on the smart glasses.

In some embodiments, the vulnerabilities detected may be fixed and resolved directly at the smart glasses of 402 and 412. In this embodiment, the application source code is fixed and directly uploaded to the source code repository 416 where the updated application source code may overwrite the original application source code.

In some embodiments, the vulnerabilities may be not be fixed at the smart glasses. In this embodiment, the vulnerability projection and mapping engine 408 may further prepare the analyzed application source code to be transferred to the internal development platform 414 for further productivity. Engine 408 may combine the application source code and the identified vulnerabilities as one file to be extracted at the internal development platform 414. The application source code may be prepared in a file format that may enable it to be ingested within the internal development platform 414.

Engine 408 may also generate a map that may match the vulnerabilities identified to the lines of code. This mapping may also be included in the one file transmitted to the internal development platform 414.

When the file is received at the internal development platform 414, the source code mapping and extraction deep learning engine 420 may extract the file and analyze the identified vulnerabilities. The source code mapping and extraction deep learning engine 420 may determine what portions of the code may be transmitted to the source code quarantine 418 for quarantining until corrected and enabled to be deployed at 414. The source code mapping and extraction deep learning engine 420 may map the application source code to the original application source code and overwrite the original application source code.

In some embodiments, the identifying may include identifying one or more vulnerabilities within the scanned application source code using machine-learning ("ML"). The identifying may include searching the application source code for one or more features stored in an ML database. Each feature may be associated with at least one of the vulnerabilities. Each vulnerability, in the ML database, may be defined as one or more features and a proximity of the one or more features to each other.

For example, a feature may be a date or a partial date. A first name and/or last name may be another feature. A string of characters including either alphanumeric characters, alpha characters or numeric characters may also be a feature. Each feature in this example may standalone as a vulnerability.

Additionally, the combination of the features, when found within a pre-defined proximity of one another may also be considered a vulnerability. For the purposes of this disclosure, when one of the mentioned features follow immediately after the other within the application source code, this may be identified as a vulnerability. For example, when the date follows immediately after or before a name, the date may be a date of birth associated with the identified name. Furthermore, when the string of characters follows immediately after or before the name, the string of characters may be a personal identification number of the identified name as well.

The smart glasses may also be enabled to communicate with the database that may store a library of a list of potential vulnerabilities and historically known vulnerabilities. The database may be stored within the internal development platform. In some embodiments, the database may be stored within an independent cloud repository on a local network. The ML may be enabled using the vulnerability library. The library may be pre-loaded with legacy examples. This library may be trained prior to being deployed with exemplary vulnerabilities that may be detected and identified within application source code. The library may also be enabled to store additional vulnerabilities identified over time by users of the smart glasses to enable ML to be more effective.

The library may further store numerous features that stand alone as a vulnerability. When in combination, one or more features may also be considered a vulnerability. The source-code vulnerability application may be enabled to, by forming different combinations of features using ML, identify vulnerabilities.

The microprocessor may also be configured to execute an editing controller application. The editing controller application may include instructions to, following the identifying of the one or more vulnerabilities, mark each identified vulnerability on the display.

Furthermore, the source code vulnerability application may include instructions to generate a vulnerability report file including the scanned application source code, each identified vulnerability and a linked vulnerability classification code.

Figure 5:
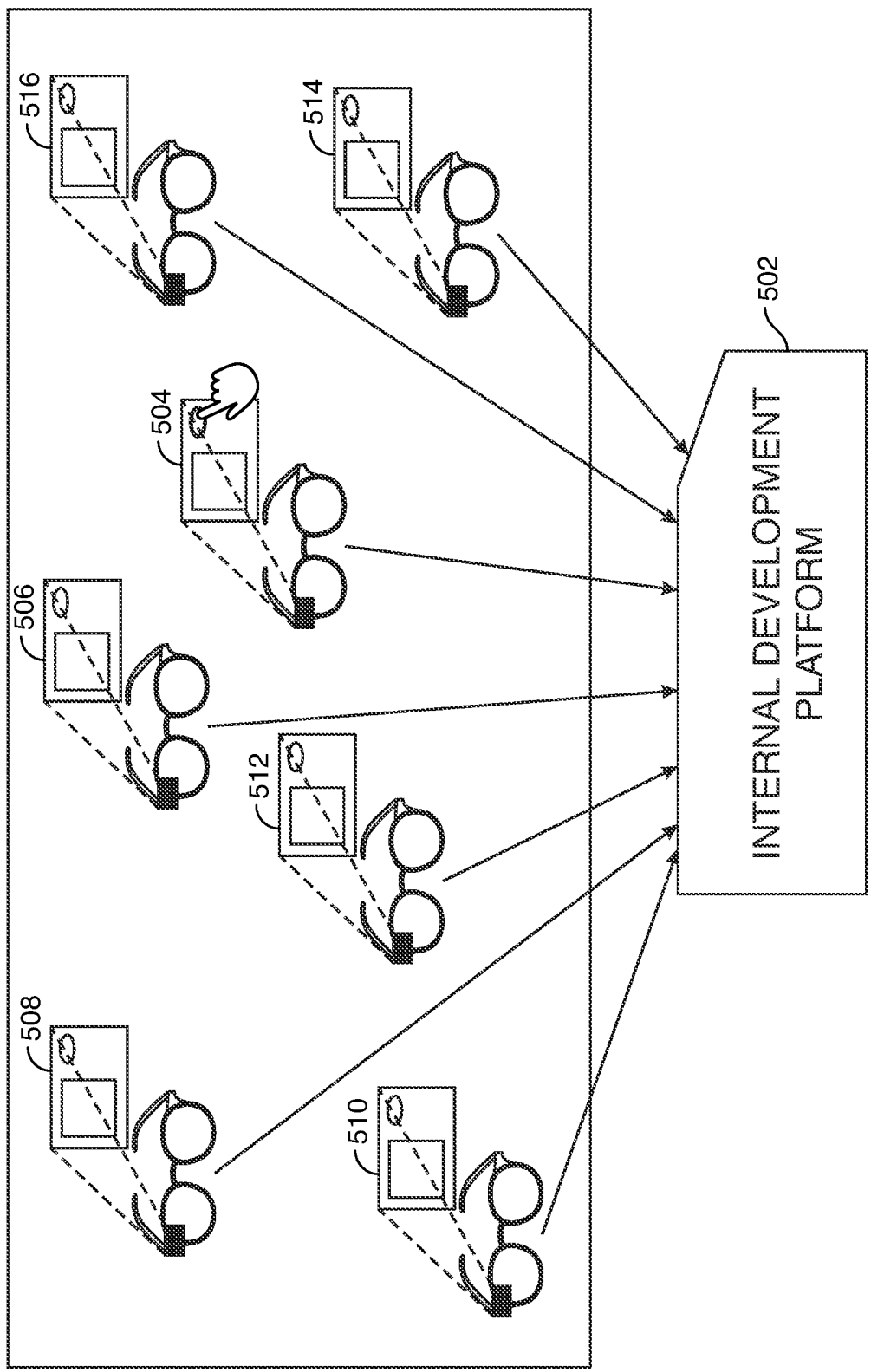
FIG. 5 shows an illustrative flow chart in accordance with principles of the disclosure.

FIG. 5 shows an illustrative diagram 500 of a plurality of smart glasses in communication with each other and directly linked to the internal development platform 502. Each of smart glasses 504, 506, 508, 510, 512, 514 and 516 may include an AR display. The AR display of each of the smart glasses 504-516 may display the same application source code.

Each of smart glasses 504-516 may be in a read-write state. In this exemplary diagram, smart glasses 504 may initiate a command to edit the application source code. The application source code may be retrieved from the internal development platform 502.

Smart glasses 504 may initiate the command by a touch gesture on AR display edit button 518. Following capturing the touch gesture at 518, the AR displays of each of the other smart glasses may be set to a view-only state and the edit button on each of the other AR displays may be deactivated.

Figure 6:
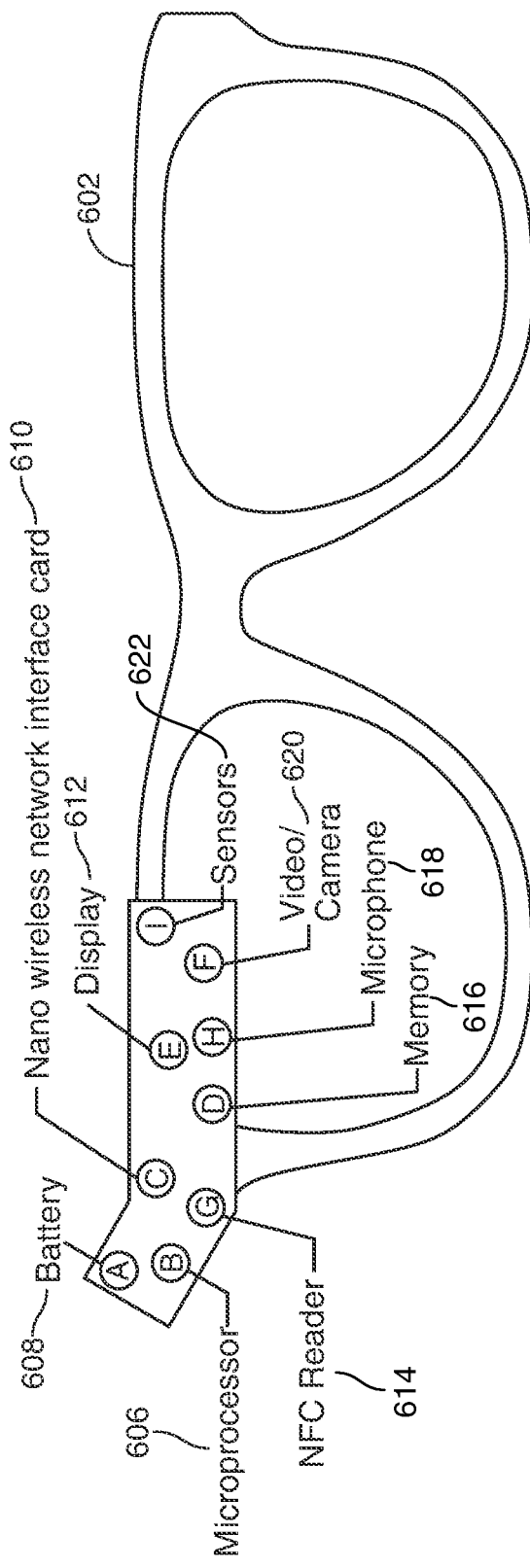
FIG. 6 shows an illustrative architecture in accordance with principles of the disclosure.

FIG. 6 shows illustrative smart glasses 602 in accordance with the invention. Illustrative smart glasses 602 may include a plurality of hardware embedded in smart glasses 602. The plurality of hardware may include one, two, some, or all of hardware A-I illustrated in FIG. 6, and, in some embodiments, additional hardware not included in FIG. 6 but described herein.

The plurality of hardware may include battery 608, microprocessor 606, NFC reader 614, nano wireless network interface card 610, display 612, sensors 622, video/camera 620, microphone 618 and memory 616. The functionalities of each of the aforementioned hardware elements is described in greater detail herein.

Thus, methods and apparatus for supporting the development of application source code using input from a first smart glasses of a first user and a second smart glasses of a second user is provided. Persons skilled in the art will appreciate that the present invention can be practiced by other than the described embodiments, which are presented for purposes of illustration rather than of limitation, and that the present invention is limited only by the claims that follow.

What is claimed is:

1. A method for supporting a development of application source code using input from a first smart glasses of a first user and a second smart glasses of a second user, the first smart glasses and the second smart glasses in electronic communication with an internal development platform, the method comprising:
retrieving, via the first smart glasses, the application source code from the internal development platform;
displaying the application source code on an augmented reality ("AR") display of the first smart glasses and an AR display of the second smart glasses, wherein the AR display of the first smart glasses and of the second smart glasses is in a read-write state, the read-write state being a default state, the read-write state enabling receiving input of one or more edits to the application source code;
receiving, from the first smart glasses, a command to edit the application source code;
in response to the receiving the command:
maintaining the read-write state on the first smart glasses; and
toggling the read-write state on the second smart glasses to a view-only state, the toggling comprising deactivating each input device of the second smart glasses;
receiving input of one or more edits from one or more input devices on the first smart glasses;
updating the application source code to include the one or more edits; and
displaying the updated application source code on the display on both the first smart glasses and the second smart glasses; and
following the displaying, toggling the view-only state of the second smart glasses back to the read-write state, the toggling comprising reactivating each input device of the second smart glasses.

2. The method of claim 1 wherein following the toggling the method comprises overwriting, at the internal development platform, the application source code with the updated application source code.

3. The method of claim 1 wherein the one or more input devices for each of the first smart glasses and the second smart glasses comprise a camera, a microphone, an AR keypad, a wireless keypad and a touch-pad embedded on a frame of the smart glasses.

4. The method of claim 3 wherein the deactivating comprises terminating a wireless connection between the second smart glasses and the one or more input devices.

5. The method of claim 1 wherein the command is inputted by selecting a selected option from selectable options displayed on the display, the selecting via an air-based hand gesture.

6. The method of claim 1 wherein the one or more edits comprise input of one or more of an alpha character, a numeric character, an alphanumeric character, an alphanumeric character string and a cross out.

7. The method of claim 1 wherein when the one or more edits comprise a voice command of the first user, the method comprises:
recording the voice command via an audio input device of the first smart glasses;
transcribing the voice command into text; and
implementing the text into the application source code displayed on both the first smart glasses and the second smart glasses.

8. The method of claim 1 further comprising, executing a vulnerability detection application on the application source code, the vulnerability detection application configured to identify one or more vulnerabilities within the application source code using machine-learning ("ML"), the identifying including searching the application source code for one or more features within the application source code corresponding to one or more features stored in a ML database, each feature being associated with at least one of the vulnerabilities.

9. The method of claim 8 wherein when one or more vulnerabilities are identified within the application source code, the method comprises, highlighting the one or more vulnerabilities on the AR display of the first smart glasses and on the AR display of the second smart glasses.

10. The method of claim 1 wherein the deactivating comprises:
receiving input of one or more edits at the one or more input devices of the second smart glasses;
temporarily storing the one or more edits at the one or more input devices; and
when the second smart glasses is toggled from the view-only state to the read-write state, the method comprises updating the application source code to include the one or more stored edits.

11. A smart glasses for supporting a development of application source code using input received at the smart glasses, the smart glasses comprising:
a pair of lenses;
a frame clasping the pair of lenses;
a nano wireless network interface card ("NIC"), said NIC for establishing communication with a wireless network;
one or more input devices operable to receive user input;
a microprocessor operable to retrieve application source code from an internal development platform and process the user input received at the smart glasses;

an augmented reality ("AR") display operable to display the application source code using augmented reality as instructed by the microprocessor to a smart glasses user, the AR display configured to operate in one of a read-write state and view-only state, the read-write state being a default state;

a battery configured to power the microprocessor, the input devices, the NIC and the AR display;

a network controller module, the network controller module is configured to interface between the nano wireless network interface card and an external Wi-Fi device to provide wireless connectivity to the smart glasses device;

an active near field communication ("NFC") reader, the active NFC reader operable to:
   detect a second smart glasses within a predetermined proximity to the smart glasses; and
   establish communication with the second smart glasses;

an NFC controller module, the NFC controller module operable to:
   activate NFC communication via the NFC reader; and
   transmit to the second smart glasses, the application source code;

an AR display of the second smart glasses operable to display the application source code using augmented reality as instructed by the microprocessor to a second smart glasses user;

the microprocessor of the smart glasses configured to:
   receive via the one or more input devices of the smart glasses, a command from the user to edit the application source code, the command being an input of a touch gesture on a selected option selected from selectable options displayed on the display of the smart glasses; and
   in response to a receipt of the command, transmit, an instruction to the second smart glasses to deactivate a one or more input devices on the second smart glasses;

a microprocessor of the second smart glasses operable to toggle a state of the AR display to a view-only state by disabling the one or more input devices from receiving input;

the microprocessor of the smart glasses configured to:
   receive input of one or more edits via one or more input devices on the smart glasses;
   update the application source code to include the one or more edits;
   share the updated application source code with the second smart glasses; and
   display the updated application source code on the display of the smart glasses;

the AR display of the second smart glasses configured to display the updated application source code on the AR display; and following the display of the updated application source code:
   reset the state of the AR display of the second smart glasses to the read-write state by reactivating each input device of the second smart glasses.

12. The smart glasses of claim 11 wherein the disabling comprises terminating a wireless communication on the second smart glasses for a pre-determined duration of time.

13. The smart glasses of claim 11 wherein the one or more edits is inputted via an AR keypad projected on the AR display of the smart glasses, the AR keypad projected on the AR display apart from the application source code displayed.

14. The smart glasses of claim 13 wherein each key on the AR keypad is depressed via a touch gesture on the key.

15. The smart glasses of claim 14 wherein each key on the AR keypad is depressed via touch gestures to one or more portions of the frame of the smart glasses.

16. The smart glasses of claim 11 wherein the one or more input devices for each of the first smart glasses and second smart glasses comprise a camera, a microphone, an AR keypad, a wireless keypad and a touch-pad embedded on a frame of the smart glasses.

17. The smart glasses of claim 11 wherein the command is inputted by selecting a selected option from selectable options displayed on the display, the selecting via an air-based hand gesture.

18. The smart glasses of claim 11 wherein the one or more edits comprise input of one or more of an alpha character, a numeric character, an alphanumeric character, an alphanumeric character string and a cross out.

19. The smart glasses of claim 11 further comprising, executing a vulnerability detection application on the application source code, the vulnerability detection application configured to identify one or more vulnerabilities within the application source code using machine-learning ("ML"), the identifying including searching the application source code for one or more features within the application source code corresponding to one or more features stored in a ML database, each feature being associated with at least one of the vulnerabilities.

20. The smart glasses of claim 19 wherein when one or more vulnerabilities is detected, the smart glasses is configured to pair with a plurality of smart glasses to resolve the vulnerability by:
   sharing the application source code with the plurality of smart glasses;
   displaying the application source code on an AR display of each of the plurality of smart glasses;
   receiving input of a command from one of the plurality of smart glasses; and
   in response to the command, setting the AR display of the smart glasses and the AR display of each of a remainder of the plurality of smart glasses to the view-only state thereby deactivating the input devices of the smart glasses and the remainder of the plurality of smart glasses.

* * * * *